United States Patent
Taylor et al.

(10) Patent No.: US 12,411,628 B2
(45) Date of Patent: Sep. 9, 2025

(54) METHOD FOR OPTIMIZING A REMOTE DATA COPY USING MULTIPLE NODES

(71) Applicant: Dell Products L.P., Round Rock, TX (US)

(72) Inventors: Alan L. Taylor, Cary, NC (US); Nagapraveen V. Seela, Cary, NC (US); Anitta Jose, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 81 days.

(21) Appl. No.: 18/380,744

(22) Filed: Oct. 17, 2023

(65) Prior Publication Data

US 2025/0123767 A1     Apr. 17, 2025

(51) Int. Cl.
     *G06F 3/06*     (2006.01)
(52) U.S. Cl.
     CPC ............ *G06F 3/065* (2013.01); *G06F 3/0604* (2013.01); *G06F 3/0635* (2013.01); *G06F 3/067* (2013.01)
(58) Field of Classification Search
     CPC ...... G06F 3/065; G06F 3/0604; G06F 3/0635; G06F 3/067
     See application file for complete search history.

(56) References Cited

U.S. PATENT DOCUMENTS

| | | | |
|---|---|---|---|
| 10,521,453 B1 * | 12/2019 | Bush | H04L 61/4552 |
| 11,269,776 B2 | 3/2022 | Chen et al. | |
| 11,409,454 B1 * | 8/2022 | Shveidel | G06F 3/0635 |
| 11,416,330 B2 | 8/2022 | Chawla et al. | |
| 11,635,897 B2 | 4/2023 | Shani et al. | |
| 2013/0218829 A1 * | 8/2013 | Martinez | G06Q 10/10 707/608 |
| 2014/0101394 A1 * | 4/2014 | Johri | G06F 3/067 711/154 |
| 2015/0378771 A1 * | 12/2015 | Tarasuk-Levin | G06F 9/45558 718/1 |
| 2016/0147607 A1 * | 5/2016 | Dornemann | G06F 3/067 711/162 |
| 2017/0003883 A1 * | 1/2017 | Hatfield | G06F 3/0683 |
| 2017/0005889 A1 * | 1/2017 | Hopcraft | H04L 43/08 |
| 2022/0229734 A1 | 7/2022 | Seela et al. | |
| 2022/0291851 A1 | 9/2022 | Tylik et al. | |
| 2023/0009529 A1 * | 1/2023 | Meiri | G06F 12/10 |

\* cited by examiner

*Primary Examiner* — Eric T Loonan
(74) *Attorney, Agent, or Firm* — BainwoodHuang

(57) ABSTRACT

Techniques for optimizing a remote data copy using multiple storage nodes. The techniques include receiving a copy command for a volume at a first node, a first subset of VOL slices being owned by the first node, and a second subset of VOL slices being owned by a second node. The techniques include obtaining, by the first node, respective diff bitmaps for the first subset of slices and the second subset of slices. The techniques include sending the diff bitmap for the second subset of slices to the second node. The techniques include performing, by the first node, a first copy operation based on the diff bitmap for the first subset of slices, and performing, by the second node, a second copy operation based on the diff bitmap for the second subset of slices, the second copy operation being performed at least partially in parallel with the first copy operation.

20 Claims, 5 Drawing Sheets

METHOD FOR OPTIMIZING A REMOTE DATA COPY USING MULTIPLE NODES

BACKGROUND

Dual node storage appliances ("dual node appliance(s)") include two (2) storage processors ("storage node(s)" or "node(s)") that have shared access to memory objects (e.g., journals, loggers, caches) and storage objects (e.g., volumes (VOL(s)), virtual volumes (VVOL(s)), logical units (LU(s)), filesystem(s)) maintained on storage drives (e.g., solid-state drives (SSD(s)), hard disk drives (HDD(s)), flash drives) of storage arrays. For high availability, a dual node appliance includes two (2) nodes in an active-active configuration. The dual node appliance operates in accordance with the Small Computer System Interface (SCSI) Asymmetrical Logical Unit Access (ALUA) standard, which specifies a mechanism for asymmetric or symmetric access of a storage object such as a VOL. The ALUA standard defines access states such as an active-optimized (AO) state and an active-non-optimized (ANO) state for paths to certain VOLs. A path having an AO state (the "AO path") is an optimized or preferred path to a certain VOL. A path having an ANO state (the "ANO path") is a non-optimized or non-preferred path to a certain VOL. A host or client computer ("storage client(s)") sends, to a first node of the dual node appliance, a storage input/output (IO) request (e.g., read request, write request) directed to a VOL over an AO path for the VOL. If there is no AO path for the VOL, then the storage client sends, to a second node of the dual node appliance, a storage IO request directed to the VOL over an ANO path for the VOL.

SUMMARY

Dual node appliances can employ SCSI extended copy ("XCOPY") technology to perform, in response to an XCOPY command, a direct transfer of data from primary storage to secondary storage within the same storage array, or to perform, in response to an enhanced XCOPY command, a direct transfer of data from primary storage to secondary storage between different storage arrays. When employing XCOPY technology in a replication environment, a single source node that has an affinity for a local storage object (e.g., a local VOL) can read data from the local VOL, and initiate a direct transfer of the data to a remote storage object (e.g., a remote VOL) of a single destination node. Such a replication process has traditionally been suitable for use with a dual node appliance that supports an AO-ANO path configuration for its storage nodes. However, the present disclosure discloses a dual node appliance that supports an AO-AO path configuration for its storage nodes. As such, the disclosed dual node appliance can receive storage IO requests directed to one or more VOLs at both its storage nodes over optimized or preferred communication paths, and service the storage IO requests potentially simultaneously at the respective storage nodes. It would be desirable to have a technique for performing direct copies or transfers of data in a replication environment that leverages advantages of an AO-AO path configuration for storage nodes of a dual node appliance.

Techniques are disclosed herein for optimizing a remote data copy using multiple storage nodes. The disclosed techniques can be suitable for use with a dual node appliance that supports an AO-AO path configuration for its storage nodes. In the disclosed techniques, the dual node appliance can receive, from a storage client, storage IO requests (e.g., read requests, write requests) directed to one or more VOLs at both its storage nodes over optimized or preferred communication paths, and service the storage IO requests potentially simultaneously at the respective nodes. In the disclosed techniques, the storage client can issue write requests to write slices at volume addresses of a VOL. Further, some of the write requests that specify particular volume addresses can be received at each respective node, creating an affinity of the particular volume addresses for that respective node, as well as an ownership relationship between that respective node and slices stored at the particular volume addresses. The disclosed techniques can include receiving a copy command or request for the VOL at a first node of the dual node appliance, in which a first subset of slices of the VOL is owned by the first node of the dual node appliance, and a second subset of slices of the VOL is owned by a second node of the dual node appliance. The disclosed techniques can include obtaining, by the first node, a difference ("diff") bitmap for the first subset of slices owned by the first node, and a diff bitmap for the second subset of slices owned by the second node. The disclosed techniques can include sending the diff bitmap for the second subset of slices from the first node to the second node. The disclosed techniques can include performing, by the first node, a first copy operation involving data changes specified in the diff bitmap for the first subset of slices. The disclosed techniques can include performing, by the second node, a second copy operation involving data changes specified in the diff bitmap for the second subset of slices, in which the second copy operation is performed at least partially in parallel with the first copy operation. In this way, direct copies or transfers of data can be performed in a replication environment that leverages advantages of the AO-AO path configuration for the storage nodes of the dual node appliance.

In certain embodiments, a method includes receiving, at a local node of a dual node storage appliance, a copy command for copying a storage object. The storage object has a first subset of slices and a second subset of slices. The first subset of slices is owned by the local node of the dual node storage appliance. The second subset of slices is owned by a peer node of the dual node storage appliance. The method includes obtaining, by the local node, a first diff bitmap for the first subset of slices owned by the local node, obtaining, by the local node, a second diff bitmap for the second subset of slices owned by the peer node, and sending, by the local node, the second diff bitmap to the peer node. The method includes performing, by the local node, a first copy operation involving data changes specified in the first diff bitmap for the first subset of slices owned by the local node, and performing, by the peer node, a second copy operation involving data changes specified in the second diff bitmap for the second subset of slices owned by the peer node. The second copy operation is performed at least partially in parallel with the first copy operation.

In certain arrangements, the method includes receiving, at the local node, a plurality of first write requests over a first active-optimized (AO) path to the local node. The plurality of first write requests specify particular first addresses of the storage object at which the first subset of slices are to be written.

In certain arrangements, the method includes receiving, at the peer node, a plurality of second write requests over a second AO path to the peer node. The plurality of second write requests specify particular second addresses of the storage object at which the second subset of slices are to be written.

In certain arrangements, the first diff bitmap has an associated bitmap size granularity corresponding to an address range of each slice owned by the local node. The method includes generating, by the local node using the first diff bitmap, a third diff bitmap for the first subset of slices owned by the local node. The third diff bitmap has an associated bitmap size granularity less than the bitmap size granularity associated with the first diff bitmap.

In certain arrangements, the method includes performing, by the local node, the first copy operation based on the third diff bitmap having the associated bitmap size granularity less than the bitmap size granularity associated with the first diff bitmap.

In certain arrangements, the second diff bitmap has an associated bitmap size granularity corresponding to an address range of each slice owned by the peer node. The method includes generating, by the peer node using the second diff bitmap, a third diff bitmap for the second subset of slices owned by the peer node. The third diff bitmap has an associated bitmap size granularity less than the bitmap size granularity associated with the second diff bitmap.

In certain arrangements, the method includes performing, by the peer node, the second copy operation based on the third diff bitmap having the associated bitmap size granularity less than the bitmap size granularity associated with the second diff bitmap. The second copy operation is performed at least partially in parallel with the first copy operation.

In certain arrangements, the method includes orchestrating, by the local node, (i) copying the data changes for the first subset of slices, and (ii) copying the data changes for the second subset of slices.

In certain arrangements, the method includes avoiding sending the data changes for the second subset of slices owned by the peer node from the local node to the peer node.

In certain embodiments, a system includes a memory, and processing circuitry configured to execute program instructions out of the memory to receive, at a local node of a dual node storage appliance, a copy command for copying a storage object. The storage object has a first subset of slices and a second subset of slices. The first subset of slices is owned by the local node of the dual node storage appliance. The second subset of slices is owned by a peer node of the dual node storage appliance. The processing circuitry is configured to execute the program instructions out of the memory to obtain, by the local node, a first diff bitmap for the first subset of slices owned by the local node, obtain, by the local node, a second diff bitmap for the second subset of slices owned by the peer node, and send, by the local node, the second diff bitmap to the peer node. The processing circuitry is configured to execute the program instructions out of the memory to perform, by the local node, a first copy operation involving data changes specified in the first diff bitmap for the first subset of slices owned by the local node, and perform, by the peer node, a second copy operation involving data changes specified in the second diff bitmap for the second subset of slices owned by the peer node. The second copy operation is performed at least partially in parallel with the first copy operation.

In certain arrangements, the processing circuitry is configured to execute the program instructions out of the memory to receive, at the local node, a plurality of first write requests over a first active-optimized (AO) path to the local node. The plurality of first write requests specify particular first addresses of the storage object at which the first subset of slices are to be written.

In certain arrangements, the processing circuitry is configured to execute the program instructions out of the memory to receive, at the peer node, a plurality of second write requests over a second AO path to the peer node. The plurality of second write requests specify particular second addresses of the storage object at which the second subset of slices are to be written.

In certain arrangements, the first diff bitmap has an associated bitmap size granularity corresponding to an address range of each slice owned by the local node. The processing circuitry is configured to execute the program instructions out of the memory to generate, by the local node using the first diff bitmap, a third diff bitmap for the first subset of slices owned by the local node. The third diff bitmap has an associated bitmap size granularity less than the bitmap size granularity associated with the first diff bitmap.

In certain arrangements, the processing circuitry is configured to execute the program instructions out of the memory to perform, by the local node, the first copy operation based on the third diff bitmap having the associated bitmap size granularity less than the bitmap size granularity associated with the first diff bitmap.

In certain arrangements, the second diff bitmap has an associated bitmap size granularity corresponding to an address range of each slice owned by the peer node. The processing circuitry is configured to execute the program instructions out of the memory to generate, by the peer node using the second diff bitmap, a third diff bitmap for the second subset of slices owned by the peer node. The third diff bitmap has an associated bitmap size granularity less than the bitmap size granularity associated with the second diff bitmap.

In certain arrangements, the processing circuitry is configured to execute the program instructions out of the memory to perform, by the peer node, the second copy operation based on the third diff bitmap having the associated bitmap size granularity less than the bitmap size granularity associated with the second diff bitmap. The second copy operation is performed at least partially in parallel with the first copy operation.

In certain arrangements, the processing circuitry is configured to execute the program instructions out of the memory to orchestrate, by the local node, (i) copying the data changes for the first subset of slices, and (ii) copying the data changes for the second subset of slices.

In certain arrangements, the processing circuitry is configured to execute the program instructions out of the memory to avoid sending the data changes for the second subset of slices owned by the peer node from the local node to the peer node.

In certain embodiments, a computer program product includes a set of non-transitory, computer-readable media having instructions that, when executed by processing circuitry, cause the processing circuitry to perform a method including receiving, at a local node of a dual node storage appliance, a copy command for copying a storage object. The storage object has a first subset of slices and a second subset of slices. The first subset of slices is owned by the local node of the dual node storage appliance. The second subset of slices is owned by a peer node of the dual node storage appliance. The method includes obtaining, by the local node, a first diff bitmap for the first subset of slices owned by the local node, obtaining, by the local node, a second diff bitmap for the second subset of slices owned by the peer node, and sending, by the local node, the second diff bitmap to the peer node. The method includes performing, by the local node, a first copy operation involving data changes specified in the first diff bitmap for the first subset of slices owned by the local node, and performing, by the peer node, a second copy operation involving data changes specified in the second diff bitmap for the second subset of slices owned by the peer node. The second copy operation is performed at least partially in parallel with the first copy operation.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an exemplary storage node that can be included in a dual node storage appliance ("dual node appliance") in the storage environment of FIG. 1a;

FIG. 2b is a block diagram of another detailed view of the storage nodes of FIG. 2a.

DETAILED DESCRIPTION

Techniques are disclosed herein for optimizing a remote data copy using multiple storage nodes. The disclosed techniques can include receiving a copy command or request for a storage object (e.g., a volume (VOL)) at a first node of a dual node appliance, in which a first subset of slices of the VOL is owned by the first node of the dual node appliance, and a second subset of slices of the VOL is owned by a second node of the dual node appliance. The disclosed techniques can include obtaining, by the first node, a difference ("diff") bitmap for the first subset of slices owned by the first node, and a diff bitmap for the second subset of slices owned by the second node. The disclosed techniques can include sending the diff bitmap for the second subset of slices from the first node to the second node. The disclosed techniques can include performing, by the first node, a first copy operation involving data changes specified in the diff bitmap for the first subset of slices. The disclosed techniques can include performing, by the second node, a second copy operation involving data changes specified in the diff bitmap for the second subset of slices, in which the second copy operation is performed at least partially in parallel with the first copy operation. In this way, direct copies or transfers of data can be performed in a replication environment that leverages advantages of an active-optimized (AO)-AO path configuration for the storage nodes of the dual node appliance.

Figure 1A:
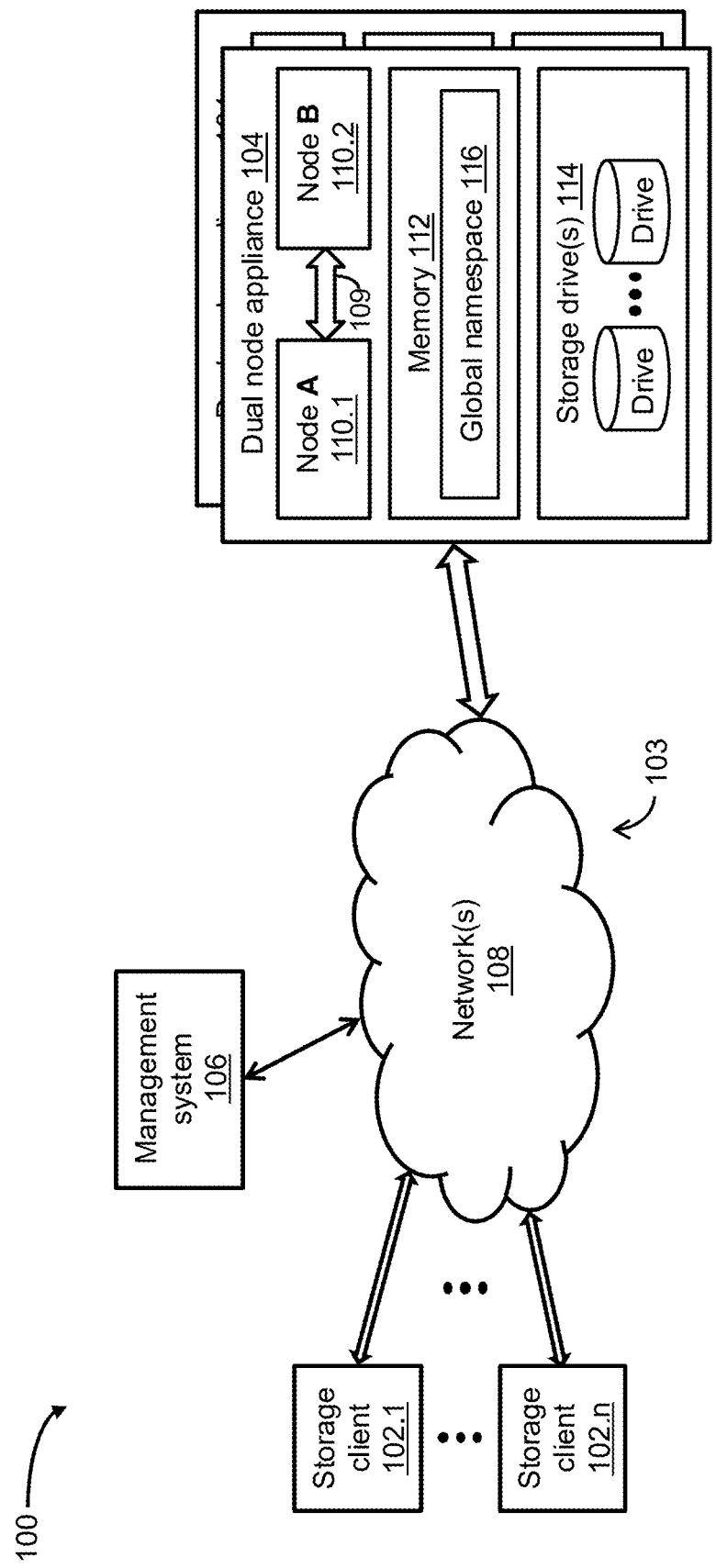
FIG. 1a is a block diagram of an exemplary storage environment, in which techniques can be practiced for optimizing a remote data copy using multiple storage nodes.

FIG. 1a depicts an illustrative embodiment of an exemplary storage environment 100, in which techniques can be practiced for optimizing a remote data copy using multiple storage nodes (or "node(s)"). As shown in FIG. 1a, the storage environment 100 can include a plurality of host or client computers ("storage clients") 102.1, . . . , 102.n, at least one dual node storage appliance ("dual node appliance(s)") 104, a management system 106, and a communications medium 103 that includes at least one network 108. An example of the dual node appliance 104 includes the PowerStore® data storage system sold by Dell EMC Corp., Hopkinton, Massachusetts USA, though certain embodiments are not so limited. As a further example, each of the storage clients 102.1, . . . , 102.n can be configured as an email server computer, a file server computer, a web server computer, and/or any other suitable computer or computerized device. The storage clients 102.1, . . . , 102.n can be part of an enterprise computer system, a cloud based computer system, or any other suitable arrangement of storage clients associated users of the dual node appliance 104. The storage clients 102.1, . . . , 102.n can be configured to provide, over the network(s) 108, storage input/output (IO) requests (e.g., small computer system interface (SCSI) commands, network file system (NFS) commands) to the dual node appliance 104. In response to the storage IO requests (e.g., read requests, write requests), the dual node appliance 104 can perform storage IO operations (e.g., read operations, write operations) that cause data blocks, files, pages, slices, or any other suitable data elements specified in the storage IO requests to be read from or written to volumes (VOLs), virtual volumes (VVOLs), logical units (LUs), filesystems, or any other suitable storage objects maintained on one or more storage drives ("drives") 114 of the dual node appliance 104.

The management system 106 can be implemented as a computer system configured to execute storage management software for managing and monitoring operations of the dual node appliance 104. The management system 106 can be configured to execute the storage management software to issue, over a control path (CP), commands for balancing operations across nodes of the dual node appliance 104, selecting a node to schedule a next operation based on current activity levels of the respective nodes, starting a synchronization activity to copy data elements (e.g., data slices) of a storage object (e.g., a VOL) from a source node to a destination node, and so on. In one embodiment, the storage management software can be configured for execution on the dual node appliance 104.

The communications medium 103 can be configured to interconnect the storage clients 102.1, . . . , 102.n with the dual node appliance(s) 104 to enable them to communicate and exchange data and control signaling. As shown in FIG. 1a, the communications medium 103 can be illustrated as a "cloud" to represent different network topologies, such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, or any suitable combination thereof.

As shown in FIG. 1a, the dual node appliance 104 can include two (2) storage processors ("storage node(s)" or "node(s)"), namely, a node A 110.1 and a node B 110.2, a memory 112, and the drive(s) 114 such as solid-state drives (SSDs), hard disk drives (HDDs), flash drives (e.g., NAND flash drives, NOR flash drives), and so on. The node A 108.1 and the node B 108.2 can be interconnected by a high bandwidth internal network 109. In one embodiment, the dual node appliance(s) 104 can be configured as a distributed filesystem. As such, the memory 112 can be configured to maintain a global namespace 116, and to present the global namespace 116 to the storage clients 102.1, ..., 102.n so that files of the distributed filesystem can appear to be in the same central location. The global namespace 116 can be implemented as a hierarchical data structure configured to index and track files across the nodes A 110.1, B 110.2. In one embodiment, the global namespace 116 can be configured as a B+ tree data structure. The drive(s) 114 can be configured to store VOLs, VVOLs, LUs, filesystems, or any other suitable storage objects for hosting data storage of client applications (e.g., email applications, file applications, web applications) running on the storage clients 102.1, ..., 102.n.

Figure 1C:
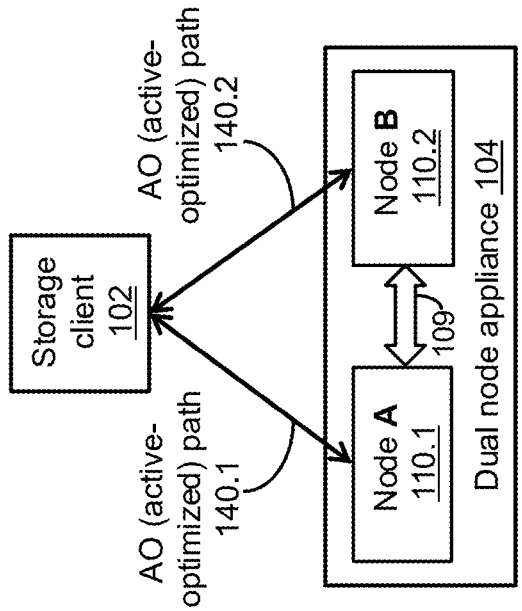
FIG. 1c is a block diagram of an exemplary storage client that can be included in the storage environment of FIG. 1a, as well as the dual node appliance that supports an active-optimized (AO)-AO path configuration for its storage nodes.
Figure 1B:
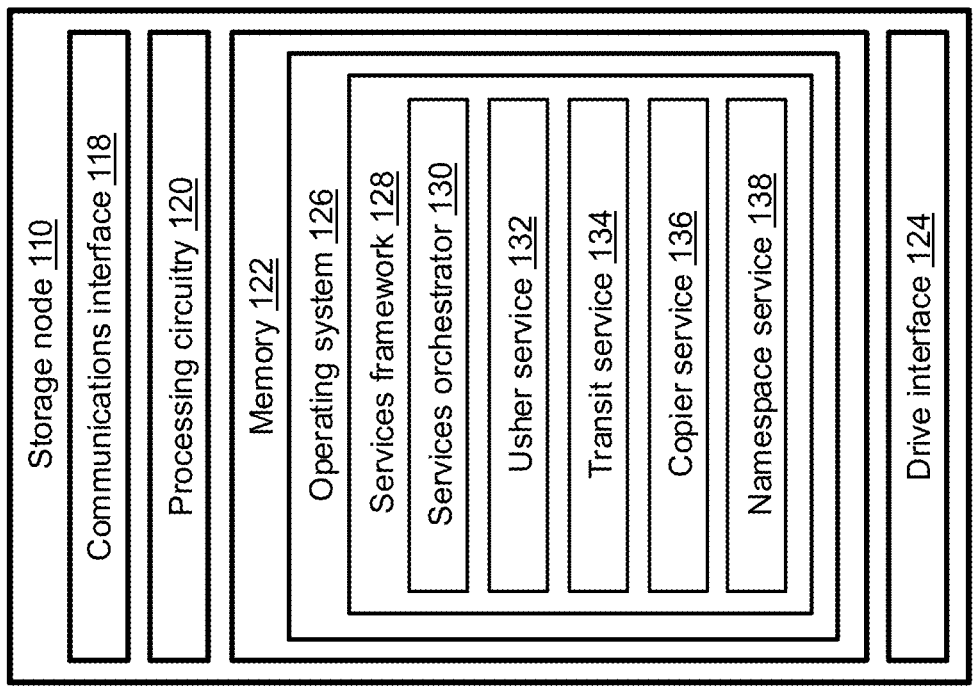

FIG. 1b depicts an exemplary configuration of a storage node 110 that can be included in the dual node appliance 104 of FIG. 1a. It is noted that each of the nodes A 110.1, B 110.2 (see FIG. 1a) can be configured like the storage node 110 of FIG. 1b. As shown in FIG. 1b, the storage node 110 can include a communications interface 118, processing circuitry 120, a memory 122, and a drive interface 124. The communications interface 118 can include an Ethernet interface, an InfiniBand interface, a Fiber Channel interface, and/or any other suitable communications interface, as well as SCSI target adapters, network interface adapters, and/or any other suitable adapters for converting electronic, optical, and/or wireless signals received over the network(s) 108 to a form suitable for use by the processing circuitry 120.

The memory 122 can include persistent memory (e.g., flash memory, magnetic memory) and non-persistent memory (e.g., dynamic random-access memory (DRAM), static random-access memory (SRAM)). The memory 122 can store an operating system (OS) 126 such as a Linux OS, Unix OS, Windows OS, or any other suitable OS. The memory 122 can further store multiple software constructs realized in the form of code and data such as library software, interconnect software, and a layered services framework 128 for at least a services orchestrator 130, an usher component (or service) 132, a transit component (or service) 134, a copier component (or service) 136, and a namespace component (or service) 138. The services orchestrator 130 can be implemented as an administrative component configured to receive CP commands to initiate a replication process for a storage object (e.g., a VOL), to initiate a snapshot creation process for a storage object, and so on. In response to such CP commands, the services orchestrator 130 can determine the components (or services) needed for the initiated process, and modify a data path (DP) call stack for the storage object accordingly. The usher service 132, which can be included in each DP call stack, can be configured as a target component for receiving storage IO requests issued by the storage clients 102.1, ..., 102.n. The transit service 134 can be configured as a protocol abstraction layer for protocols such as iSCSI, TCP, NVMe-oF, and so on, for use in communicating with other storage nodes or systems. The copier service 136 can be used in the replication process to copy data between two (2) storage objects (e.g., VOLs). The namespace service 138 can be configured to initiate tasks involving the global namespace 116, and to provide file-like semantics to access data stored on storage objects (e.g., VOLs) maintained on the drive(s) 114. The namespace service 138 can be further configured to provide an interface for other services within the services framework 128 to create and delete storage objects, read/write data from/to storage objects, obtain and set attributes of storage objects, and so on. The drive interface 124 can be configured to facilitate data transfers from/to the drive(s) 114. The drive interface 124 can include one or more disk adapters or controllers for interfacing with SSDs, HDDs, flash drives, and so on.

FIG. 1c depicts an exemplary configuration of a storage client 102 and the dual node appliance 104. It is noted that each of the storage clients 102.1, ..., 102.n (see FIG. 1a) can be configured like the storage client 102 of FIG. 1c. As shown in FIG. 1c, the storage client 102 can be configured to communicate with the node A 110.1 over a path 140.1, and to communicate with the node B 110.2 over a path 140.2. In one embodiment, the storage client 102 and the dual node appliance 104 can be configured to operate in accordance with the SCSI Asymmetrical Logical Unit Access (ALUA) standard (the "ALUA standard"). The ALUA standard specifies a mechanism for asymmetric or symmetric access of a storage object (e.g., a VOL). In accordance with the ALUA standard, the dual node appliance 104 can set an access state of a path for a VOL with respect to particular initiator and target ports, such as an active-optimized (AO) state or an active-non-optimized (ANO) state. It is noted that a path for a certain VOL having the AO state (the "AO path") is preferred over any other path for that VOL having the ANO state (the "ANO path"). As shown in FIG. 1c, the storage client 102 can access a VOL via the node A 110.1 using the AO path 140.1, as well as access the VOL via the node B 110.2 using the AO path 140.2. In other words, the dual node appliance 104 supports an AO-AO path configuration for its nodes A 110.1, B 110.2. As such, the dual node appliance 104 can receive, from the storage client 102, storage IO requests (e.g., read requests, write requests) directed to the VOL at both its nodes A 110.1, B 110.2 over optimized or preferred communication paths, and can service the storage IO requests potentially simultaneously at the respective nodes A 110.1, B 110.2.

During operation, the storage client 102 (see FIG. 1c) can issue, to the dual node appliance 104, write requests to write data elements (e.g., data slices) at volume addresses of a VOL maintained on one or more of the drives 114 (see FIG. 1a). Some of the write requests specifying particular addresses of the VOL can be received, over the AO paths 140.1, 140.2 (see FIG. 1c), at each respective node A 110.1, B 110.2, thereby creating an affinity of the particular volume addresses for the respective node A 110.1, B 110.2, as well as an ownership relationship between the respective node A 110.1, B 110.2 and slices stored at the particular volume addresses. The management system 106 (see FIG. 1a) can select one of the nodes A 110.1, B 110.2 to schedule a copy operation based on current activity levels of the nodes A 110.1, B 110.2, and issue, over the control path (CP), a copy command or request to the selected node A 110.1 or B 110.2 to start a synchronization activity, which includes copying the slices of the VOL owned by the respective nodes A 110.1, B 110.2 to one or more destinations. In this way, direct copies or transfers of data can be performed in a replication environment that leverages advantages of the AO-AO path configuration for the storage nodes A 110.1, B 110.2.

The disclosed techniques for optimizing a remote data copy using multiple storage nodes will be further understood with reference to the following illustrative example, as well as FIGS. 1a, 1b, 1c, 2a, and 2b. In this example, it is assumed that slices are written to a VOL maintained on one or more of the drives 114 via the nodes A 110.1, B 110.2 of the dual node appliance 104 (see FIG. 1a), which supports an AO-AO path configuration for the nodes A 110.1, B 110.2. It is further assumed that the management system 106

Figure 2A:
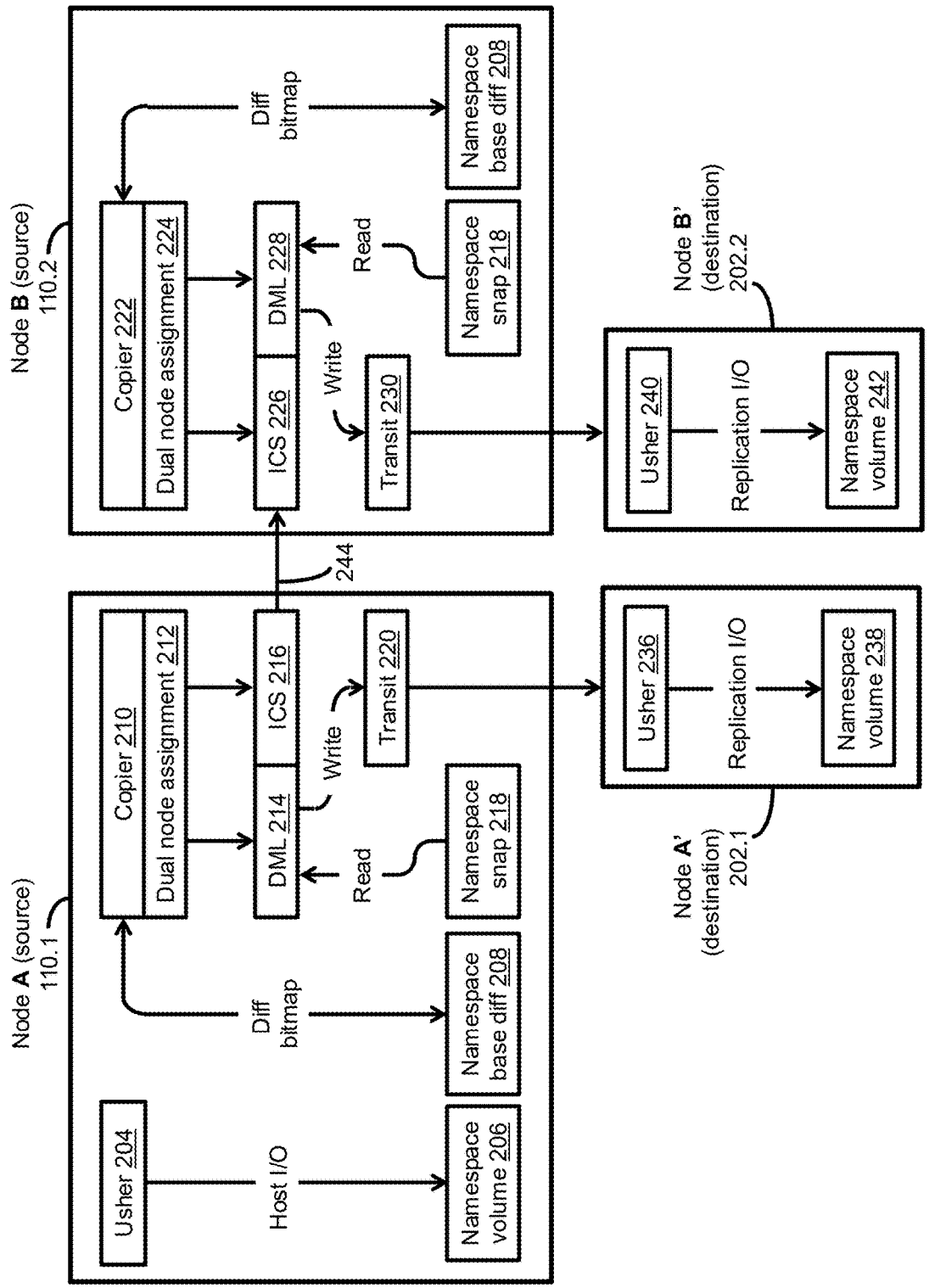
FIG. 2a is a block diagram of a detailed view of the storage nodes of the dual node appliance, in which the storage nodes are configured to perform direct copies or transfers of data via respective destination nodes.

(see FIG. 1a) selects the node A 110.1 to schedule a copy operation, and issues a copy command or request to the node A 110.1 to start a synchronization activity for copying slices of the VOL owned by (or assigned to) the node A (source) 110.1 to a first backup or target VOL (e.g., a namespace volume 238; see FIG. 2a), and for copying slices of the VOL owned by (or assigned to) the node B (source) 110.2 to a second backup or target VOL (e.g., a namespace volume 242; see FIG. 2a).

Figure 2B:
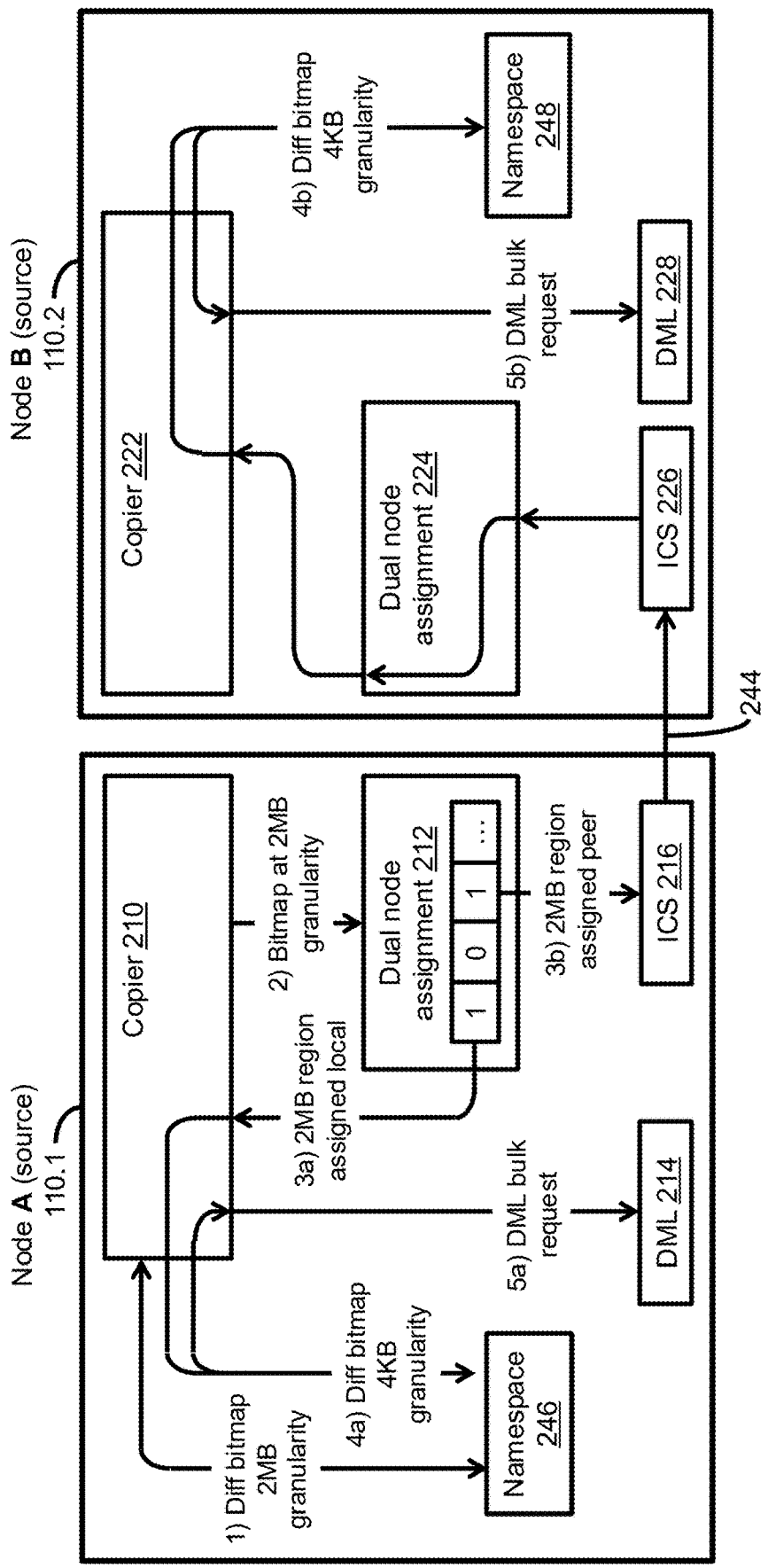

FIGS. 2a and 2b depict detailed views of the node A (source) 110.1 and the node B (source) 110.2 of the dual node appliance 104, in which the nodes A 110.1, B 110.2 are configured to perform direct copies or transfers of volume data to the namespace volume 238 and the namespace volume 242 via the node A' (destination) 202.1 and the node B' (destination) 202.2, respectively. The node A (source) 110.1 includes, within the services framework 128 (see FIG. 1b), an usher component 204, a copier component 210, a transit component 220, and a namespace component 246 (see FIG. 2b). The node A (source) 110.1 further includes a data movement library (DML) 214 and an interconnect component (or service) ICS 216 (see FIG. 2a). Likewise, the node B (source) 110.2 includes, within the services framework 128, an usher component (not shown), a copier component 222, a transit component 230, and a namespace component 248 (see FIG. 2b). The node B (source) 110.2 further includes a DML 228 and an ICS 226. As shown in FIG. 2a, the node A' (destination) 202.1 and the node B' (destination) 202.2 include, within the services framework 128, an usher component 236 and an usher component 240, respectively.

In this example, the node A (source) 110.1 receives, at the usher component 204, write requests (or host IO) issued by the storage client 102 over the AO path 140.1 (see FIG. 1c). Likewise, the node B (source) 110.2 receives, at its usher component (not shown), write requests (or host IO) issued by the storage client 102 over the AO path 140.2 (see FIG. 1c). Some of the write requests specifying particular addresses of the VOL are received at each respective node A 110.1, B 110.2, creating an affinity of the particular volume addresses for the respective node A 110.1, B 110.2, as well as an ownership relationship between the respective node A 110.1, B 110.2 and slices stored at the particular volume addresses. In response to the write requests (or host IO), the slices owned by (or assigned to) the respective nodes A 110.1, B 110.2 are written to the VOL (e.g., a namespace volume 206; see FIG. 2a). It is noted that such namespace volumes, as well as snapshots ("snaps") of namespace volumes (e.g., namespace snap(s), namespace base snap(s)), are maintained on one or more of the drives 114 (see FIG. 1a).

The synchronization activity started at the node A 110.1 can include performing an asynchronous replication process implemented using a snapshot difference ("snap-diff") technique (e.g., snap-diff API). In accordance with the replication process, at a first point in time, a first snapshot is taken of the namespace volume 206, and data of the namespace volume 206, as reflected by the first snapshot, are synchronized via the transit components 220, 230 on the backup or target VOLs (e.g., the namespace volumes 238, 242; see FIG. 2a). In this example, the first snapshot corresponds to a common base snapshot (or "namespace base" snap) of the namespace volume 206. At a second point in time (e.g., as denoted by an occurrence of a recovery point objective (RPO) synchronization point), a second snapshot (e.g., a namespace snap 218; see FIG. 2a) is taken of the namespace volume 206, and the snap-diff technique is performed to obtain or compute a diff bitmap (e.g., a namespace base diff 208; see FIG. 2a) for data (e.g., data block) differences or changes between the namespace base snap and the namespace snap 218. Further, the data differences or changes, as reflected by the namespace base snap, are synchronized via the transit components 220, 230 on the backup or target VOLs (e.g., the namespace volumes 238, 242; see FIG. 2a). It is noted that, upon occurrence of a next RPO synchronization point, the foregoing process can be repeated using the namespace snap 218 as the namespace base snap.

More particularly, in this example, once the namespace snap 218 is obtained, the copier component 210 of the node A (source) 110.1 reads data of the namespace snap 218 using the DML 214, and performs the snap-diff technique using the namespace component 246 (see FIG. 2b) to obtain or compute a hierarchical diff bitmap for the data (e.g., data block) differences or changes between the namespace base snap and the namespace snap 218. For example, the namespace volume 206 may correspond to a large VOL having a size of sixty-four (64) terabytes (TB). Further, the copier component 210 may obtain or compute, using the namespace component 246, the hierarchical diff bitmap in three (3) phases, namely, (i) a first phase, in which each set bit of a first diff bitmap of the hierarchy corresponds to one (1) gigabyte (GB) of address range, (ii) a second phase, in which, for each set bit of the first diff bitmap of the hierarchy, each set bit of a second diff bitmap of the hierarchy corresponds to two (2) megabytes (MB) of address range, and (iii) a third phase, in which, for each set bit of the second diff bitmap of the hierarchy, each set bit of a third diff bitmap of the hierarchy corresponds to four (4) kilobytes (KB) of address range. In this example, the third diff bitmap having a bitmap size granularity of 4 KB is employed by the copier component 210 to generate a data movement bulk copy request ("DML bulk request"). It is noted that any other suitable volume size and/or bitmap size granularities may be employed. In this way, the copier component 210 can obtain or compute, using the namespace component 246, a hierarchical diff bitmap that includes three (3) bitmap levels, namely, a first diff bitmap at 1 GB granularity, a second diff bitmap at 2 MB granularity, and a third diff bitmap at 4 KB granularity, in a manner that can save both time and memory space.

As shown in FIG. 2b, with reference to a path "1", once the diff bitmap at 1 GB granularity has been computed, the copier component 210 of the node A (source) 110.1 obtains the diff bitmap at 2 MB granularity from the namespace component 246. It is noted that, in this example, each slice of the VOL (e.g., the namespace volume 206; see FIG. 2a) owned by the node A (source) 110.1 (as well as each slice of the VOL owned by the node B (source) 110.2) corresponds to 2 MB of source address range. With reference to a path "2" of FIG. 2b, the copier component 210 provides the diff bitmap at 2 MB granularity to a dual node assignment component 212, which, using the diff bitmap at 2 MB granularity, identifies which slices containing data (e.g., data block) differences or changes are owned by which node A 110.1 (the "local" node) or node B 110.2 (the "peer" node). For example, "odd" slices of the VOL (as indicated by non-set or "0" bits of the dual node assignment component 212; see FIG. 2b) may be owned by the node A 110.1, and "even" slices of the VOL (as indicated by set or "1" bits of the dual node assignment component 212; see FIG. 2b) may be owned by the node B 110.2. With reference to a path "3a" of FIG. 2b, the dual node assignment component 212 provides a diff bitmap at 2 MB granularity for the identified slices owned by the local node A 110.1 to the copier component 210, which, with reference to a path "4*a*" of FIG. 2*b*, uses the namespace component 246 to obtain or compute a diff bitmap at 4 KB granularity for the respective slices. In one embodiment, the dual node assignment component 212 can be a sub-component of the copier component 210. With reference to a path "5*a*" of FIG. 2*b*, the copier component 210 generates a copy (write) request based on the diff bitmap at 4 KB granularity for the identified slices owned by the local node A 110.1, and provides the copy (write) request in the form of a DML bulk request using the DML 214. As shown in FIG. 2*a*, the node A' (destination) 202.1 receives the DML bulk request (or replication IO) at its usher component 236, and performs a data copy for the identified slices owned by the local node A 110.1 to destination address ranges of a target VOL based on the DML bulk request. In this example, the target VOL of the data copy for the slices owned by the local node A 110.1 is the namespace volume 238 (see FIG. 2*a*).

With reference to a path "3*b*" of FIG. 2*b*, the dual node assignment component 212 provides a diff bitmap at 2 MB granularity for the identified slices owned by the peer node B 110.2 to the ICS 216, which sends, over a high bandwidth internal network 244, the provided diff bitmap at 2 MB granularity to the ICS 226 of the peer node B 110.2. The diff bitmap at 2 MB granularity for the identified slices owned by the peer node B 110.2 passes through the dual node assignment component 224 to the copier component 222, which, with reference to a path "4*b*" of FIG. 2*b*, uses the namespace component 248 to obtain or compute a diff bitmap at 4 KB granularity for the respective slices. In one embodiment, the dual node assignment component 224 can be a sub-component of the copier component 222. With reference to a path "5*b*" of FIG. 2*b*, the copier component 222 generates a copy (write) request based on the diff bitmap at 4 KB granularity for the identified slices owned by the peer node B 110.2, and provides the copy (write) request in the form of a DML bulk request using the DML 228. As shown in FIG. 2*a*, the node B' (destination) 202.2 receives the DML bulk request (or replication IO) at its usher component 240, and performs a data copy for the identified slices owned by the peer node B 110.2 to destination address ranges of a target VOL based on the DML bulk request. In this example, the target VOL of the data copy for the slices owned by the peer node B 110.2 is the namespace volume 242 (see FIG. 2*a*).

In this example, the node A 110.1, which was selected by the management system 106 to schedule a copy operation, ultimately orchestrates a copy of volume data for both the node A 110.1 and the node B 110.2. Further, during performance of the copy operation, diff bitmap information, rather than the volume data itself, is sent or communicated from the local (selected) node A 110.1 to the peer node B 110.2 based on node assignments for the respective volume slices. In addition, in this example, the data copy performed by the peer node B 110.2 is performed at least partially in parallel with the data copy performed by the local node A 110.1. In this way, the direct copy or transfer of volume data by the dual node appliance 104 can leverage advantages of the AO-AO path configuration for its nodes A 110.1, B 110.2.

Figure 3:
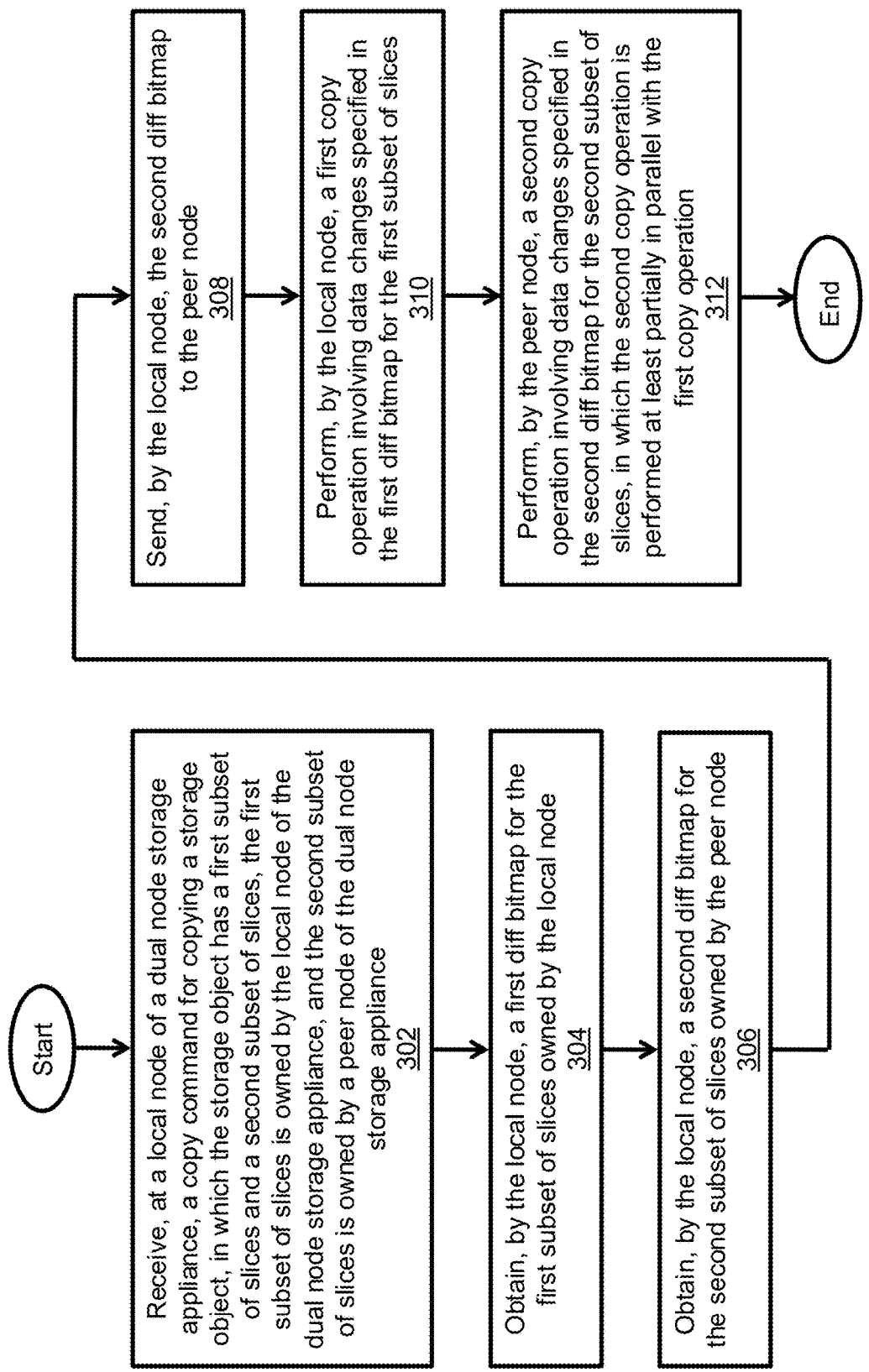
FIG. 3 is a flow diagram of an exemplary method of optimizing a remote data copy using multiple storage nodes.

A method of optimizing a remote data copy using multiple storage nodes is described below with reference to FIG. 3. As depicted in block 302, a copy command for copying a storage object is received at a local node of a dual node storage appliance, in which the storage object has a first subset of slices and a second subset of slices, the first subset of slices is owned by the local node of the dual node storage appliance, and the second subset of slices is owned by a peer node of the dual node storage appliance. As depicted in block 304, a first diff bitmap for the first subset of slices owned by the local node is obtained by the local node. As depicted in block 306, a second diff bitmap for the second subset of slices owned by the peer node is obtained by the local node. As depicted in block 308, the second diff bitmap is sent by the local node to the peer node. As depicted in block 310, a first copy operation involving data changes specified in the first diff bitmap for the first subset of slices is performed by the local node. As depicted in block 312, a second copy operation involving data changes specified in the second diff bitmap for the second subset of slices is performed by the peer node, in which the second copy operation is performed at least partially in parallel with the first copy operation.

Having described the above illustrative embodiments, various alternative embodiments and/or variations may be made and/or practiced. For example, it was described herein that a synchronization activity can include copying slices of a volume owned by (or assigned to) the node A (source) 110.1 (see FIG. 2*a*) to a first backup or target volume and copying slices of the volume owned by (or assigned to) the node (source) B 110.2 (see FIG. 2*a*) to a second backup or target volume. In one embodiment, the volume slices owned by (or assigned to) both the node A 110.1 and the node B 110.2 can be copied to the same backup or target volume.

It was further described herein that a diff bitmap having a bitmap size granularity of 4 KB (or any other suitable bitmap size granularity) can be employed by the copier component 210 or 222 (see FIG. 2*a*) to generate a DML bulk request. To that end, in one embodiment, once the diff bitmaps of 4 KB granularity are obtained, each of the copier components 210, 222 can generate a scatter gather list (SGL) that includes a list of tuples, each of which includes an offset and length for a specified copy range. Further, the copier components 210, 222 can provide the SGLs to the DMLs 214, 228, respectively, and issue, at least partially in parallel, storage IOs to the backup or target VOL(s) with respect to the offsets and lengths included in the SGLs for the specified copy ranges.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash drives (e.g., NAND flash drives, NOR flash drives), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive, solid state drive, or flash drive, a combination of hard drives, solid state drives, and flash drives, a combination of hard drives, solid state drives, flash drives, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
    receiving, at a local node of a dual node storage appliance, a copy command for copying a storage object, the storage object having a first subset of slices and a second subset of slices, the first subset of slices being owned by the local node of the dual node storage appliance, the second subset of slices being owned by a peer node of the dual node storage appliance;
    obtaining, by the local node, a first diff bitmap for the first subset of slices owned by the local node;
    obtaining, by the local node, a second diff bitmap for the second subset of slices owned by the peer node;
    sending, by the local node, the second diff bitmap to the peer node;
    performing, by the local node, a first copy operation involving data changes specified in the first diff bitmap for the first subset of slices owned by the local node; and
    performing, by the peer node, a second copy operation involving data changes specified in the second diff bitmap for the second subset of slices owned by the peer node, the second copy operation being performed at least partially in parallel with the first copy operation.

2. The method of claim 1 further comprising:
    receiving, at the local node, a plurality of first write requests over a first active-optimized (AO) path to the local node, the plurality of first write requests specifying particular first addresses of the storage object at which the first subset of slices are to be written.

3. The method of claim 2 further comprising:
    receiving, at the peer node, a plurality of second write requests over a second AO path to the peer node, the plurality of second write requests specifying particular second addresses of the storage object at which the second subset of slices are to be written.

4. The method of claim 3 wherein the first diff bitmap has an associated bitmap size granularity corresponding to an address range of each slice owned by the local node, and wherein the method further comprises:
    generating, by the local node using the first diff bitmap, a third diff bitmap for the first subset of slices owned by the local node, the third diff bitmap having an associated bitmap size granularity less than the bitmap size granularity associated with the first diff bitmap.

5. The method of claim 4 wherein the performing of the first copy operation includes performing, by the local node, the first copy operation based on the third diff bitmap having the associated bitmap size granularity less than the bitmap size granularity associated with the first diff bitmap.

6. The method of claim 3 wherein the second diff bitmap has an associated bitmap size granularity corresponding to an address range of each slice owned by the peer node, and wherein the method further comprises:
    generating, by the peer node using the second diff bitmap, a third diff bitmap for the second subset of slices owned by the peer node, the third diff bitmap having an associated bitmap size granularity less than the bitmap size granularity associated with the second diff bitmap.

7. The method of claim 6 wherein the performing of the second copy operation includes performing, by the peer node, the second copy operation based on the third diff bitmap having the associated bitmap size granularity less than the bitmap size granularity associated with the second diff bitmap, the second copy operation being performed at least partially in parallel with the first copy operation.

8. The method of claim 1 wherein the receiving of the copy command for copying a storage object includes orchestrating, by the local node, (i) copying the data changes for the first subset of slices, and (ii) copying the data changes for the second subset of slices.

9. The method of claim 1 further comprising:
    avoiding sending the data changes for the second subset of slices owned by the peer node from the local node to the peer node.

10. A system comprising:
    a memory; and
    processing circuitry configured to execute program instructions out of the memory to:
        receive, at a local node of a dual node storage appliance, a copy command for copying a storage object, the storage object having a first subset of slices and a second subset of slices, the first subset of slices being owned by the local node of the dual node storage appliance, the second subset of slices being owned by a peer node of the dual node storage appliance;

obtain, by the local node, a first diff bitmap for the first subset of slices owned by the local node;

obtain, by the local node, a second diff bitmap for the second subset of slices owned by the peer node;

send, by the local node, the second diff bitmap to the peer node;

perform, by the local node, a first copy operation involving data changes specified in the first diff bitmap for the first subset of slices owned by the local node; and perform, by the peer node, a second copy operation involving data changes specified in the second diff bitmap for the second subset of slices owned by the peer node, the second copy operation being performed at least partially in parallel with the first copy operation.

11. The system of claim 10 wherein the processing circuitry is further configured to execute the program instructions out of the memory to receive, at the local node, a plurality of first write requests over a first active-optimized (AO) path to the local node, the plurality of first write requests specifying particular first addresses of the storage object at which the first subset of slices are to be written.

12. The system of claim 11 wherein the processing circuitry is further configured to execute the program instructions out of the memory to receive, at the peer node, a plurality of second write requests over a second AO path to the peer node, the plurality of second write requests specifying particular second addresses of the storage object at which the second subset of slices are to be written.

13. The system of claim 12 wherein the first diff bitmap has an associated bitmap size granularity corresponding to an address range of each slice owned by the local node, and wherein the processing circuitry is further configured to execute the program instructions out of the memory to generate, by the local node using the first diff bitmap, a third diff bitmap for the first subset of slices owned by the local node, the third diff bitmap having an associated bitmap size granularity less than the bitmap size granularity associated with the first diff bitmap.

14. The system of claim 13 wherein the processing circuitry is further configured to execute the program instructions out of the memory to perform, by the local node, the first copy operation based on the third diff bitmap having the associated bitmap size granularity less than the bitmap size granularity associated with the first diff bitmap.

15. The system of claim 12 wherein the second diff bitmap has an associated bitmap size granularity corresponding to an address range of each slice owned by the peer node, and wherein the processing circuitry is further configured to execute the program instructions out of the memory to generate, by the peer node using the second diff bitmap, a third diff bitmap for the second subset of slices owned by the peer node, the third diff bitmap having an associated bitmap size granularity less than the bitmap size granularity associated with the second diff bitmap.

16. The system of claim 15 wherein the processing circuitry is further configured to execute the program instructions out of the memory to perform, by the peer node, the second copy operation based on the third diff bitmap having the associated bitmap size granularity less than the bitmap size granularity associated with the second diff bitmap, the second copy operation being performed at least partially in parallel with the first copy operation.

17. The system of claim 10 wherein the processing circuitry is further configured to execute the program instructions out of the memory to orchestrate, by the local node, (i) copying the data changes for the first subset of slices, and (ii) copying the data changes for the second subset of slices.

18. The system of claim 10 wherein the processing circuitry is further configured to execute the program instructions out of the memory to avoid sending the data changes for the second subset of slices owned by the peer node from the local node to the peer node.

19. A computer program product including a set of non-transitory, computer-readable media having instructions that, when executed by processing circuitry, cause the processing circuitry to perform a method comprising:

receiving, at a local node of a dual node storage appliance, a copy command for copying a storage object, the storage object having a first subset of slices and a second subset of slices, the first subset of slices being owned by the local node of the dual node storage appliance, the second subset of slices being owned by a peer node of the dual node storage appliance;

obtaining, by the local node, a first diff bitmap for the first subset of slices owned by the local node;

obtaining, by the local node, a second diff bitmap for the second subset of slices owned by the peer node;

sending, by the local node, the second diff bitmap to the peer node;

performing, by the local node, a first copy operation involving data changes specified in the first diff bitmap for the first subset of slices owned by the local node; and performing, by the peer node, a second copy operation involving data changes specified in the second diff bitmap for the second subset of slices owned by the peer node, the second copy operation being performed at least partially in parallel with the first copy operation.

20. The computer program product of claim 19 wherein the method further comprises:

receiving, at the local node, a plurality of first write requests over a first active-optimized (AO) path to the local node, the plurality of first write requests specifying particular first addresses of the storage object at which the first subset of slices are to be written; and receiving, at the peer node, a plurality of second write requests over a second AO path to the peer node, the plurality of second write requests specifying particular second addresses of the storage object at which the second subset of slices are to be written.

* * * * *